(12) United States Patent
Posa et al.

(10) Patent No.: US 6,596,109 B2
(45) Date of Patent: Jul. 22, 2003

(54) UNITARY MULTI-COMPONENT FILTER MEDIA

(75) Inventors: James M. Posa, North Hampton, NH (US); Michael P. McCarthy, Salem, NH (US)

(73) Assignee: Lydall, Inc., Manchester, CT (US)

( * ) Notice: Subject to any disclaimer, the term of this patent is extended or adjusted under 35 U.S.C. 154(b) by 103 days.

(21) Appl. No.: 09/915,585

(22) Filed: Jul. 27, 2001

(65) Prior Publication Data

US 2002/0053388 A1 May 9, 2002

Related U.S. Application Data

(60) Provisional application No. 60/221,206, filed on Jul. 27, 2000.

(51) Int. Cl.[7] .............................................. B32B 31/16
(52) U.S. Cl. ................... 156/73.2; 156/290; 156/308.4; 428/198
(58) Field of Search ............................. 156/73.1, 73.2, 156/290, 308.2, 308.4, 580.1, 580.2; 428/198

(56) References Cited

U.S. PATENT DOCUMENTS

| | | | |
|---|---|---|---|
| 3,256,122 A | 6/1966 | Wands et al. | 156/73.1 |
| 3,920,428 A | 11/1975 | Kinsley, Jr. | 55/528 |
| 4,265,689 A | 5/1981 | Jeffrey | 156/73.2 |
| 4,318,774 A | 3/1982 | Powell et al. | 162/129 |
| 4,728,349 A | 3/1988 | Oshitari | 55/487 |
| 5,215,609 A | 6/1993 | Sanders | 156/70 |
| 5,240,479 A * | 8/1993 | Bachinski | 55/103 |
| 5,306,534 A * | 4/1994 | Bosses | 428/35.2 |
| 5,800,769 A | 9/1998 | Haskett | 264/484 |
| 5,900,305 A | 5/1999 | Chapman | 428/198 |

FOREIGN PATENT DOCUMENTS

GB        2 256 601 A        12/1992

* cited by examiner

*Primary Examiner*—James Sells
(74) *Attorney, Agent, or Firm*—Birch, Stewart, Kolasch & Birch, LLP

(57) ABSTRACT

A high efficiency particulate air (HEPA) filter made from a layer of electrostatically-charged thermoplastic fiber scrim that is point-bonded to a layer of glass fiber batting to form a composite layer defining an area, wherein the point-bonding is distributed over substantially all of the area of the composite layer and the bond points constitute approximately 1% to approximately 6% of the total surface area of the welded filter material, and wherein the composite layer is substantially uncompressed. Also, a process for forming the filter by providing an ultrasonic rotary drum having a large number of projections from the surface of the drum, passing a layer of electrostatically-charged thermoplastic fiber scrim resting on top of a layer of glass fiber batting over said drum in such a manner that said projections do not substantially penetrate into the subassembly, and passing the subassembly resting on top of the projections under an ultrasonic horn emitting high frequency sound waves into the subassembly to form point-bonds in the vicinity of the projections.

9 Claims, 3 Drawing Sheets

UNITARY MULTI-COMPONENT FILTER MEDIA

This application claims priority on provisional Application No. 60/221,206 filed on Jul. 27, 2000, the entire contents of which are hereby incorporated by reference.

FIELD OF THE INVENTION

This invention relates to air filter media. More particularly, this invention relates to a high efficiency filtration medium made by combining two or more different components into a unitary structure in such a way that the resultant product is capable of successfully removing both very small and larger particles from an air stream while at the same time exhibiting an acceptable degree of pressure drop.

BACKGROUND OF THE INVENTION

Due to adverse effects attributable to inhaling particles, including particles smaller than 10 microns, filtration media has been developed that will remove such particles from air streams. Filters employing such media are commonly referred to as HEPA filters, that is, High Efficiency Particulate Air filters.

Originally, HEPA grade filter media was manufactured from asbestos, glass wool, rock wool, and some organic fibers. A medium formed of a matrix of asbestos fibers combined with paper fibers was found to be the best for rapid, large scale commercial production. Subsequently, microfiber glass paper was used for HEPA filters. Common commercial HEPA media have been composed of borosilicate glass microfibers bound together by acrylic resin. Recently there has been interest in replacing glass microfiber media with organic fiber media in HEPA filters. Commonly used organic media is formed from meltblown media that carries an electrostatic charge.

A typical electrostatic material used in medical applications involves as fibers a thermoplastic mixture of a polyalkylene fiber such as polypropylene and an anionically substituted acrylic fiber. The fibers are needled together to a layer of scrim material on the lower side, and a top layer of scrim is then applied to the needled fabric to assure retention of loose fibers. This filtration medium is generally sealed along all its outer edges.

Recently, Rick Chapman discovered that stacking and spot-laminating layers of meltblown electrostatic filter media can increase the efficiency of the media without significant pressure drop. U.S. Pat. No. 5,900,305. Chapman teaches feeding a plurality of (similar) webs into the nip of heated rollers, thus compressing the webs; column 5, lines 55–57. In lines 14–30 of column 7, Chapman teaches feeding a plurality of (similar) layers into the nip between a patterned roller and a set of ultrasonic generators. Raised dots on Chapman's roller are pressed into a softened assembly to form a pattern of impression dots.

It is known that filtration efficiencies can be greatly improved by including in the filter media an electrostatic layer, e.g. produced by corona discharge, for filtering very small particles. It is also known that comparatively open glass fiber batts are quite efficient in removing larger particles from an air stream. This invention provides a filter that includes both charged filter media and a glass fiber batt, joined together in such a way as to provide a unitary filter having the advantages of both the charged media and the glass fiber batt.

There are several theoretical approaches to attaching a charged synthetic media layer to a glass fiber batt layer. While the two layers may be laminated together with adhesives or the like, adhesive coverage may be difficult to control and can result in substantial "blinding" of the unitary filter, i.e., substantial increase in the pressure drop across the filter. Even when it is attempted to place the adhesive in discrete spots, the adhesive tends to spread and, again, a substantial increase in the pressure drop across the filter can result. Needling the charged media and the glass fiber batt is not satisfactory, because the needling tends to disrupt the surface of the media, and it is difficult to get substantial needling into the glass fiber batt. Thus, prior to the present invention, it had not been practical to attempt the combination of the charged media and the glass fiber batt into a unitary filter media.

Ultrasonic bonding of two or more synthetic fiber webs using ultrasonic rotary drum bonder-laminators is known. Bonding takes place by fusing molecules the synthetic fiber web layers, that is, by melting. The rotary drum of the bonder-laminator generally has a pattern of projections on the surface of the drum. When ultrasonic waves are emitted from one or more horns, the waves concentrate at the projections. The energy of the waves is absorbed by the webs, with the absorption being concentrated at the projections. Hence, when the webs melt, the melt at discrete, small points at the projections. The bonded webs, thus, have a pattern of point-melt connections corresponding to the pattern of projections. Chapman (U.S. Pat. No. 5,900,305, discussed above) presses together a plurality of synthetic fiber webs in order to facilitate ultrasonic bonding thereof.

SUMMARY OF THE INVENTION

The present invention involves the discovery that a charged media and a glass fiber batt can be assembled into a unitary filter by means of a particular approach to ultrasonic welding of the charged media to the glass fiber batt. The projections from the ultrasonic rotary drum are so sized and the passing of a combination of the charged media layer and glass fiber batt layer over the drum is such that the projections do not substantially penetrate into this combination of layers and the combination of layers essentially rests on the top of the drum projections. The less the penetration of the drum projection into the combined layers, the more the original properties of each layer will be retained by the welded unitary filter. The combination of layers, being disposed on such a drum having projections as described, is then passed under one or more ultrasonic horns.

It has been found that this technique can be used to bond a synthetic web to a glass fiber web. The glass fibers will not melt because the ultrasonic wave energy cannot heat the glass fibers to their melting (softening) temperatures. Since the charged synthetic media layer is normally made of thermoplastic fibers in the form of a spunbonded web or scrim or a meltblown layer or the like, the concentrated vibrational energies at the projections will cause a melting of the thermoplastic fibers of the charged media only where those projections are encountered by the combination of the glass batt and the charged media.

This bonded web with the charged scrim can increase the efficiency of a filter made of the glass fiber web from a low efficiency to a HEPA efficiency filter.

More specifically, the present invention provides high efficiency particulate air filters that include a layer of electrostatically-charged thermoplastic fiber scrim which is point-bonded to a layer of glass fiber batting to form a composite layer defining an area. In these filters, the point-bonding is distributed over substantially all of the area of the composite layer and the bond points constitute approximately 1% to approximately 6% of the total surface area of the welded filter material, and the composite layer is substantially uncompressed. The point-bonding typically constitutes approximately 150 to 6000 welds per square foot, with the welds preferably being uniformly distributed over the entire area of the composite layer.

The present invention also provides a process for forming high efficiency particulate air filters, the process comprising the steps of providing an ultrasonic rotary drum having a large number of projections from the surface of the drum, tips of the projections distributed over substantially all of the area of the drum and constituting approximately 1% to approximately 6% of the total surface area of a cylindrical plane defined by the tips of the projections, passing a subassembly comprising a layer of electrostatically-charged thermoplastic fiber scrim resting on top of a layer of glass fiber batting over said drum in such a manner that said projections do not substantially penetrate into the subassembly, and passing said subassembly resting on top of said projections under an ultrasonic horn emitting high frequency sound waves into the subassembly in the substantial absence of compression of the subassembly to form point-bonds in the vicinity of the projections.

DETAILED DESCRIPTION OF THE INVENTION

Figure 1:
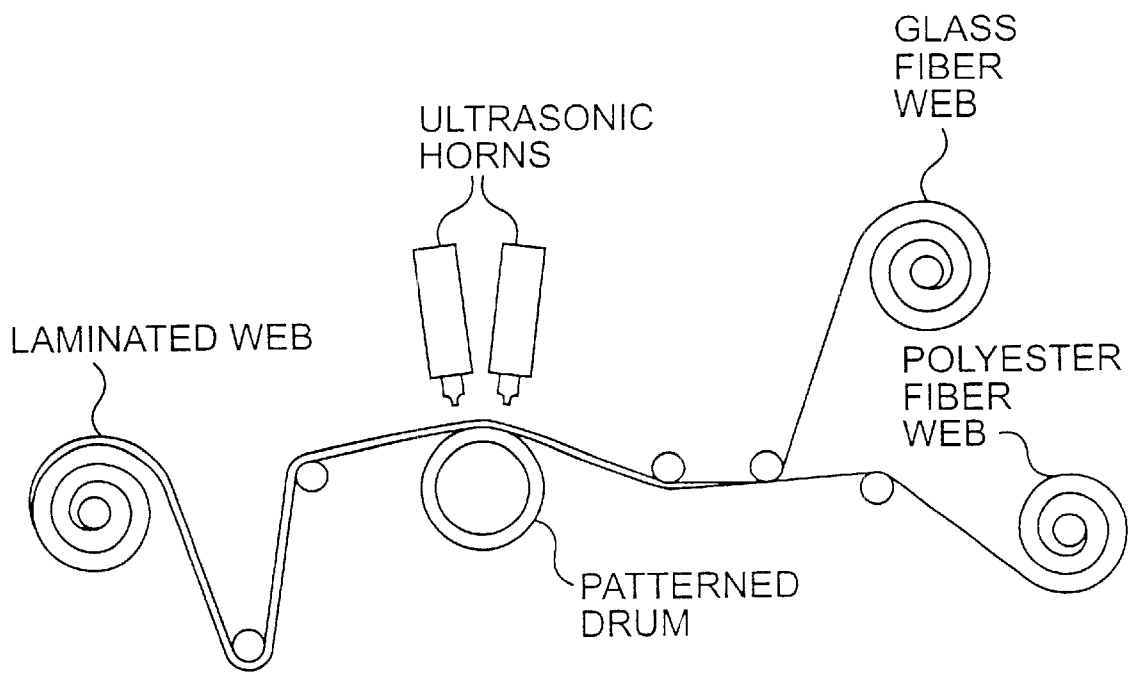
FIG. 1 is a schematic plan view of an embodiment of the method of the present invention, illustrating a line configuration for manufacture of a filter medium.

In accordance with the present invention, a charged media and a glass fiber batt are assembled into a unitary filter by means of a particular approach to ultrasonic welding of the charged media to the glass fiber batt. FIG. 1 illustrates one possible line configuration for the manufacture of filter media in accordance with the present invention.

The combination of layers may be passed under the ultrasonic horn in the substantial absence of compression. That is, no positive compression need be applied to the composite during the point-bonding procedure. However, some small degree of compression, such as that caused by gravity and/or tensioning of the layers, is acceptable in the practice of the present invention.

Figure 2:
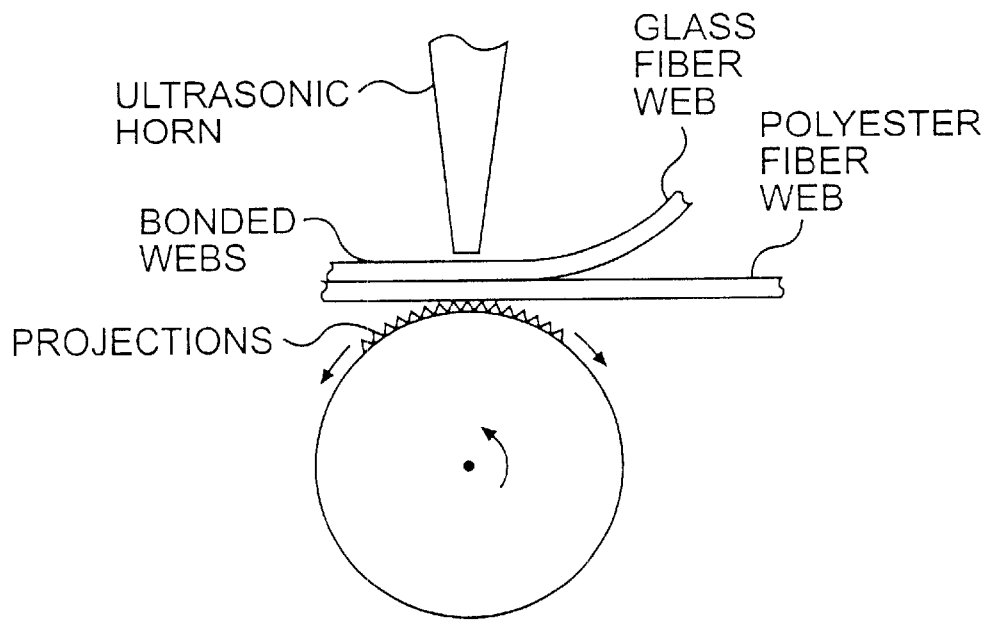
FIG. 2 is an enlarged schematic plan view of an embodiment of the method of the present invention, illustrating in close-up the relative positions of drum projections, horn, and fabric components.

The ultrasonic rotary drum that is utilized has a large number of very small projections from the surface of the drum. The number of projections, per square foot, may be from as little as about 100 up to about 5000 or more. These projection from the drum are so sized and the passing of a combination of the charged media layer and glass fiber batt layer over the drum is such that the projections do not substantially penetrate into this combination of layers. In other words, the combination of layers essentially rests on the top of the drum projections, as illustrated in FIG. 2. The combination of layers, being disposed on such a drum having projections as described, is then passed under a conventional ultrasonic horn. The high frequency sound waves pass into the combination and the vibrational energy is concentrated at the projections.

It has been found that this technique can be used to bond a synthetic web to a glass fiber web. The glass fibers will not melt because the ultrasonic wave energy cannot heat the glass fibers to their melting (softening) temperatures. Since the charged synthetic media layer is normally made of thermoplastic fibers in the form of a spun-bonded web or scrim or a meltblown layer or the like, the concentrated vibrational energies at the projections will cause a melting of the thermoplastic fibers of the charged media only where those projections are encountered by the combination of the glass batt and the charged media.

Figure 3:
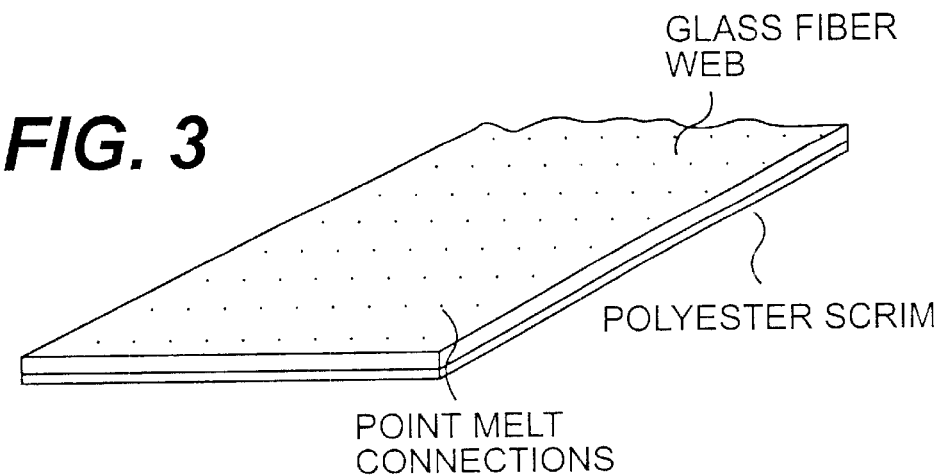
FIG. 3 is a fragmentary perspective view illustrating an embodiment of the present invention.

Since the projections are very small in cross-section, only a small pinpoint of welding takes place at each projection. Furthermore, since the projections at the point of contact will constitute only about 1% to 6% of the surface area of the charged media/glass batt combination, the resulting welds between the charged media and the glass fiber batt will, likewise, constitute only about 1% to 6% of the total surface area of the welded filter material. This is illustrated in FIG. 3. This translates into an increase in pressure drop across the combined filter material of only about 1% to 6%, which is quite acceptable.

Weld coverage is dependent upon the shape and size of the projection and resultant weld as well as upon the number of welds per unit area. Typical variants are listed in Table I.

TABLE I

| Pattern | Number of welds | Shape and size of weld | Welded area |
| --- | --- | --- | --- |
| NP | 144/sq. ft. | circular: diameter 0.093 in. | 0.76% |
| Diamond | 524/sq. ft. | circular: diameter 0.39 in. | 1.00% |
| TX | 5203/sq. ft | circular: diameter 0.5 mm. | 2.25% |
| TR | 5110/sq. ft. | rectangular: 0.5 × 1.0 mm. | 2.75% |

Figure 4:
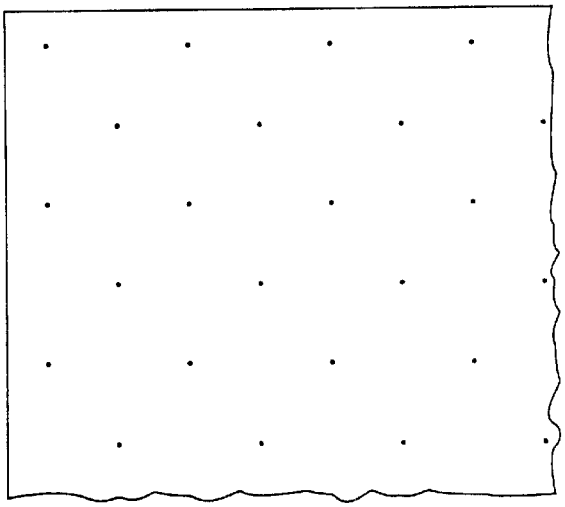
FIG. 4 is a top view of a filter medium of the present invention.

Pattern NP is depicted in FIG. 4. Pattern TR is depicted in FIG. 5.

Figure 5:
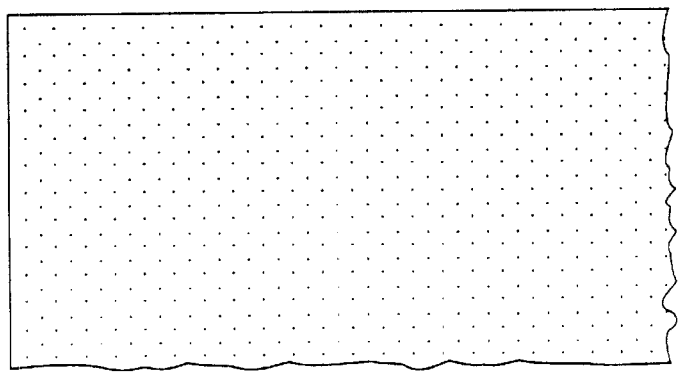
FIG. 5 is a top view of a filter medium of the present invention.

As exemplified in FIGS. 4 and 5, the point bonding—which in itself involves at most about 6% of the surface area of the composite—is distributed over substantially all of the area of the composite. The term "substantially" in this context denotes enough of the area of the composite to ensure that the layers stay adhered to one another in normal usage.

The glass fiber batt is made of relatively fine glass fibers, e.g. 0.2 to 20 microns in diameter, and is produced by conventional airlaying or wetlaying techniques. The glass fiber batt can be of a relatively wide range of thicknesses, e.g. from as little as 0.1 millimeters to as much as 20 millimeters or more. Preferredly, the glass fiber web is a 3.5–3.8 millimeter web or a 3.8–4.3 millimeter web.

The charged media is, preferably, a relatively thin media, e.g. from 0.05 millimeters up to about 10 millimeters, and is made by conventional techniques of spun-bonding, airlaying, meltblowing, and the like. The synthetic media is first passed through a conventional corona to charge it after it is formed. The charged scrim is then passed through the bonder as described above. The preferred synthetic web of the invention is a polyester fiber scrim (a thin spunbonded or airlaid web).

Figure 6:
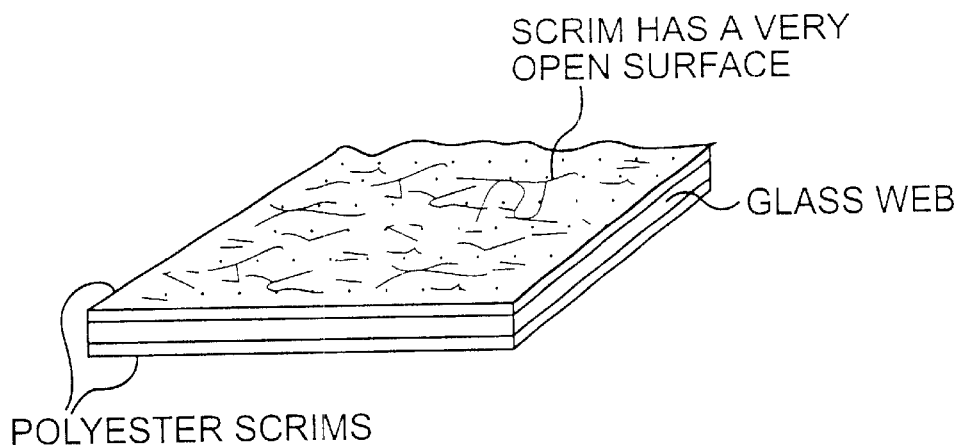
FIG. 6 is an enlarged fragmentary perspective view illustrating an embodiment of the present invention.
Figure 7:
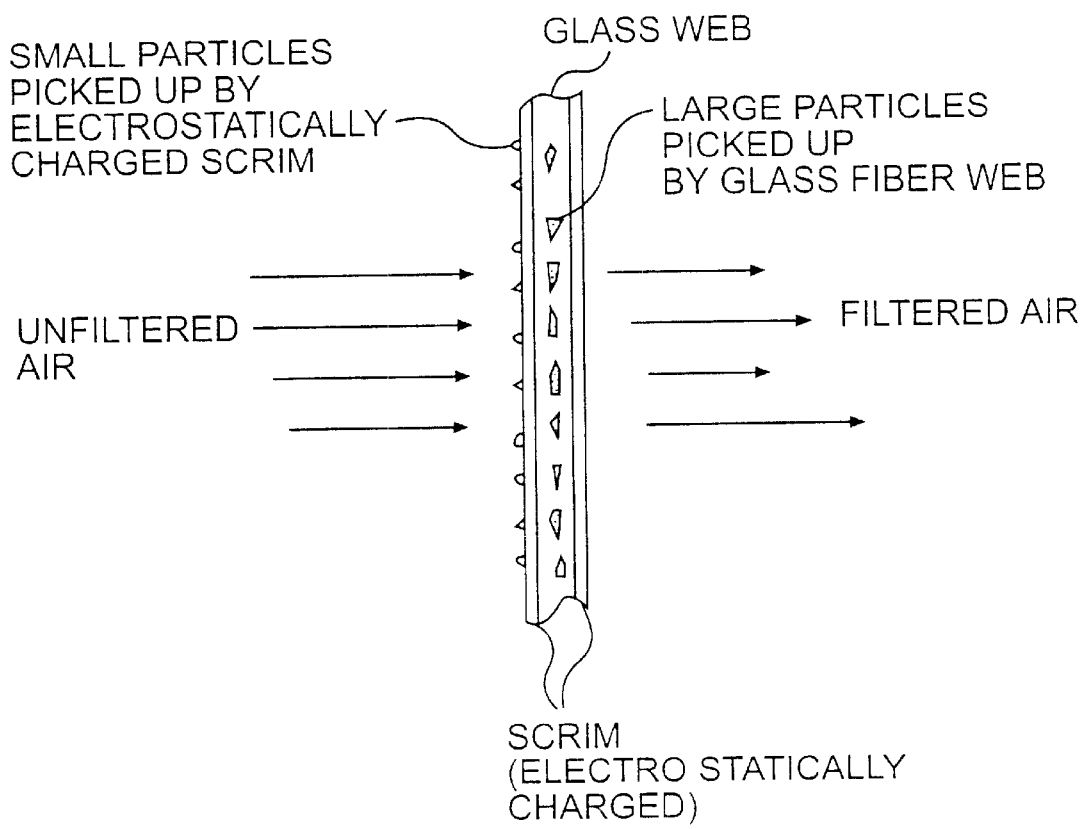
FIG. 7 is a side view of an embodiment of the present invention, illustrating the manner in which differently-sized particles are removed from air thereby.

Two polyester fiber scrims may be used to sandwich the glass fiber web, as illustrated in FIGS. 6 and 7.

The invention being thus described, various modifications of the materials and methods used in the practice of the invention will be readily apparent to one of ordinary skill in the art. Such modifications are considered to be encompassed by the scope of the invention as described in the claims below.

What is claimed is:

1. A high efficiency particulate air filter comprising a layer of electrostatically-charged thermoplastic fiber scrim that is point-bonded to a layer of glass fiber batting to form a composite layer defining an area, wherein the point-bonding is distributed over substantially all of the area of the composite layer and the bond points constitute approximately 1% to approximately 6% of the total surface area of the welded filter material, and wherein the composite layer is substantially uncompressed.

2. The filter of claim 1, wherein the point-bonding constitutes approximately 150 to 6000 welds per square foot, said welds being uniformly distributed over the area of the composite layer.

3. The filter of claim 1, wherein the glass fiber batting comprises airlaid or wetlaid fibers 0.2 to 20 microns in diameter.

4. The filter of claim 1, wherein the glass fiber batting ranges in thickness form 0.1 millimeters to 20 millimeters.

5. The filter of claim 1, wherein the thermoplastic fiber scrim comprises a spunbonded or an airlaid polyester web.

6. The filter of claim 1, where the thermoplastic fiber scrim ranges in thickness from 0.05 to 10 millimeters.

7. A process for forming a high efficiency particulate air filter comprising the steps of:

providing an ultrasonic rotary drum having a large number of projections from the surface of the drum, tips of the projections distributed over substantially all of the area of the drum and constituting approximately 1% to approximately 6% of the total surface area of a cylindrical plane defined by the tips of the projections, passing a subassembly comprising a layer of electrostatically-charged thermoplastic fiber scrim resting on top of a layer of glass fiber batting over said drum in such a manner that said projections do not substantially penetrate into the subassembly, and passing said subassembly resting on top of said projections under an ultrasonic horn emitting high frequency sound waves into the subassembly in the substantial absence of compression of the subassembly to form point-bonds in the vicinity of the projections.

8. The process of claim 7, wherein said projection are uniformly distributed over the surface of said drum.

9. The process of claim 7, having 150 to 6000 projection from the surface of the drum.

* * * * *